(12) United States Patent
Wifvesson et al.

(10) Patent No.: US 11,070,631 B2
(45) Date of Patent: Jul. 20, 2021

(54) EXPLICIT SPATIAL REPLAY PROTECTION

(71) Applicant: Telefonaktiebolaget LM Ericsson (publ), Stockholm (SE)

(72) Inventors: Monica Wifvesson, Lund (SE);
Noamen Ben Henda, Stockholm (SE);
Vesa Lehtovirta, Espoo (FI);
Katharina Pfeffer, Graz (AT);
Shabnam Sultana, Montreal (CA);
Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 16/069,759

(22) PCT Filed: Nov. 24, 2016

(86) PCT No.: PCT/EP2016/078653
§ 371 (c)(1),
(2) Date: Jul. 12, 2018

(87) PCT Pub. No.: WO2017/129286
PCT Pub. Date: Aug. 3, 2017

(65) Prior Publication Data
US 2019/0028553 A1 Jan. 24, 2019

Related U.S. Application Data

(60) Provisional application No. 62/286,602, filed on Jan. 25, 2016.

(51) Int. Cl.
*H04L 29/08* (2006.01)
*H04W 4/02* (2018.01)
(Continued)

(52) U.S. Cl.
CPC ............. *H04L 67/16* (2013.01); *H04W 4/023* (2013.01); *H04W 4/025* (2013.01); *H04W 12/02* (2013.01);
(Continued)

(58) Field of Classification Search
CPC ...... H04L 67/16; H04W 4/023; H04W 88/04; H04W 12/10; H04W 12/02; H04W 4/025
See application file for complete search history.

(56) References Cited

U.S. PATENT DOCUMENTS 8,774,032 B2 7/2014 Vialen et al.
9,043,602 B1 * 5/2015 Krieger ................. H04L 63/123
713/181
(Continued)

FOREIGN PATENT DOCUMENTS

CN 101963996 A 2/2011
CN 105009610 A 10/2015
(Continued)

OTHER PUBLICATIONS

Study on extended architecture support for proximity-based services (Release 13);3GPP TR.23.713:2015.*
(Continued)

*Primary Examiner* — Charles C Jiang
*Assistant Examiner* — Voster Preval
(74) *Attorney, Agent, or Firm* — Murphy, Bilak & Homiller, PLLC (57) ABSTRACT

A terminal device, for example a 3GPP Proximity Services (ProSe)-enabled user equipment, obtains imprecise location information relating to a location of the terminal device, and transmits a proximity service discovery message, wherein the discovery message includes the imprecise location information. A second terminal device, again for example a 3GPP Proximity Services (ProSe)-enabled user equipment,
(Continued)

402 — OBTAIN IMPRECISE LOCATION INFORMATION RELATING TO LOCATION OF TERMINAL DEVICE

404 — TRANSMIT PROXIMITY SERVICE DISCOVERY MESSAGE INCLUDING IMPRECISE LOCATION INFORMATION receives a proximity service discovery message containing location information. The second terminal device obtains location information relating to its location, and calculates a distance from the location indicated by the location information in the received discovery message to its location. The second terminal device acts on the received discovery message only if the calculated distance is less than a predetermined distance.

15 Claims, 7 Drawing Sheets

(51) Int. Cl.
    *H04W 12/12*     (2021.01)
    *H04W 12/106*     (2021.01)
    *H04W 12/02*     (2009.01)
    *H04W 88/04*     (2009.01)

(52) U.S. Cl.
    CPC ......... *H04W 12/106* (2021.01); *H04W 12/12* (2013.01); *H04W 88/04* (2013.01)

(56) References Cited

U.S. PATENT DOCUMENTS

| | | |
|---|---|---|
| 9,820,105 B2 | 11/2017 | Snyder et al. |
| 10,034,215 B2 | 7/2018 | Zhang et al. |
| 2004/0142710 A1 | 7/2004 | Liang |
| 2006/0193299 A1 | 8/2006 | Winget et al. |
| 2009/0022152 A1 | 1/2009 | Henry et al. |
| 2012/0106738 A1 | 5/2012 | Belenkiy et al. |
| 2014/0031028 A1 | 1/2014 | Yamada et al. |
| 2014/0056220 A1 | 2/2014 | Poitau et al. |
| 2014/0119544 A1 | 5/2014 | Lee |
| 2014/0162687 A1 | 6/2014 | Edge |
| 2014/0192766 A1 | 7/2014 | Akisada et al. |
| 2014/0244329 A1 | 8/2014 | Urban |
| 2015/0015441 A1* | 1/2015 | Chiou ................. G01S 1/02 342/386 |
| 2015/0042447 A1 | 2/2015 | Vogt et al. |
| 2015/0072713 A1* | 3/2015 | Zhu ................. H04W 8/005 455/456.3 |
| 2015/0271675 A1 | 9/2015 | Cheng et al. |
| 2015/0334550 A1* | 11/2015 | Klatt ................. H04W 8/005 455/434 |
| 2015/0339718 A1 | 11/2015 | Walton et al. |
| 2015/0341794 A1* | 11/2015 | Vanderveen ............ H04L 67/16 705/14.58 |
| 2016/0128116 A1* | 5/2016 | Kim ........................ H04W 4/70 370/329 |
| 2016/0242029 A1* | 8/2016 | Agiwal ..................... H04L 9/12 |
| 2016/0302137 A1* | 10/2016 | Escott ................... H04W 76/10 |
| 2017/0289154 A1 | 10/2017 | Krieger et al. |
| 2017/0374549 A1 | 12/2017 | Anil et al. |
| 2018/0199388 A1 | 7/2018 | Tabet et al. |
| 2018/0234827 A1* | 8/2018 | Stojanovski ...... H04W 12/0433 |
| 2018/0279394 A1 | 9/2018 | Peng et al. |
| 2019/0080353 A1 | 3/2019 | Bleecher Snyder et al. |

FOREIGN PATENT DOCUMENTS

| | | |
|---|---|---|
| CN | 105025444 A | 11/2015 |
| KR | 20150082434 A | 7/2015 |
| RU | 2013154418 A | 6/2015 |
| WO | 2014208033 A3 | 3/2015 |
| WO | 2015158055 A1 | 10/2015 |

OTHER PUBLICATIONS

Study on extended architecture support for proximity-based services (Release 13);3GPP TR.23.713: Sep. 2015.*
3GPP, "3GPP TR 23.713 V13.0.0 (Sep. 2015)", 3rd Generation Partnership Project; Technical Specification Group Services and System Aspects; Study on extended architecture support for proximity-bases services (Release 13), Sep. 2015, pp. 1-80.
3GPP, "3GPP TS 22.042 V12.0.0 (Oct. 2014)", 3rd Generation Partnership Project; Technical Specification Group Services and System Aspects; Network Identity and TimeZone (NITZ); Service description; Stage 1 (Release 12), Oct. 2014, pp. 1-8.
3GPP, "3GPP TS 22.278 V13.1.0 (Sep. 2014)", 3rd Generation Partnership Project; Technical Specification Group Services and System Aspects; Service requirements for the Evolved Packet System (EPS) (Release 13), Sep. 2014, pp. 1-45.
3GPP, "3GPP TS 22.278 V13.2.0 (Dec. 2014)", 3rd Generation Partnership Project; Technical Specification Group Services and System Aspects; Service requirements for the Evolved Packet System (EPS) (Release 13), Dec. 2014, pp. 1-46.
3GPP, "3GPP TS 23.303 V12.4.0 (Mar. 2015)", 3rd Generation Partnership Project; Technical Specification Group Services and System Aspects; Proximity-based services (proSe); Stage 2 (Release 12), Mar. 2015, pp. 1-63.
3GPP, "3GPP TS 23.303 V13.0.0 (Jun. 2015)", 3rd Generation Partnership Project; Technical Specification Group Services and System Aspects; Proximity-based services (ProSe); Stage 2 (Release 13), Jun. 2015, pp. 1-97.
3GPP, "3GPP TS 23.303 V13.2.0 (Dec. 2015)", 3rd Generation Partnership Project; Technical Specification Group Services and System Aspects; Proximity-based services (ProSe); Stage 2 (Release 13), Dec. 2015, pp. 1-122.
3GPP, "3GPP TS 23.303 V13.3.0 (Mar. 2016)", 3rd Generation Partnership Project; Technical Specification Group Services and System Aspects; Proximity-based services (ProSe); Stage 2 (Release 13), Mar. 2016, pp. 1-124.
3GPP, "3GPP TS 36.300 V13.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Dec. 2015, pp. 1-290.
3GPP, "3GPP TS 36.300 V13.3.0 (Mar. 2016)", 3rd Generation Partnership Project; Technical Specification Group Radio, Access Network; Evolved Universal Terrestrial Radio Access (E-UTRA) and Evolved Universal Terrestrial Radio Access Network (E-UTRAN); Overall description; Stage 2 (Release 13), Mar. 2016, pp. 1-295.
Ericsson, "Spatial Replay Protection Mechanisms for ProSe Discovery", 2GPP TSG-SA WG3 Meeting #82, S3-160179, Dubrovnik, Croatia, Feb. 1-5, 2016, pp. 1-6.
3GPP, "3GPP TS 22.278 V13.0.0 (Jun. 2014)", 3rd Generation Partnership Project; Technical Specification Group Services and System Aspects; Service requirements for the Evolved Packet System (EPS) (Release 13), Jun. 2014, pp. 1-45.
Interdigital, "Authorization for broadcasting and use of location information over PC5 for restricted discovery", SA WG2 Meeting #109, S2-151799, Fukuoka, Japan, May 25-29, 2015, 1-7.

* cited by examiner

EXPLICIT SPATIAL REPLAY PROTECTION

TECHNICAL FIELD

This invention relates to methods of operation of a terminal device and a network node in a cellular communications network.

BACKGROUND

Proximity Services (ProSe) are new features of a 3GPP communications network, providing services for ProSe-enabled user equipment devices (UEs) in proximity of each other. These features are standardized in TS 22.278 v13.0.0 and TS 23.303 v13.0.0.

ProSe features consist of ProSe discovery and ProSe direct communication. ProSe discovery identifies ProSe-enabled UEs in proximity of each other. ProSe direct communication enables the establishment of communication paths between ProSe-enabled UEs in direct communication range.

One issue with the current protocol is that it may be possible for an attacker to listen on the air interface at a first location, collect discovery messages broadcast by a first UE, and broadcast the discovery messages from a second location. A second UE, in the vicinity of the second location, can be deceived into believing that it is in the vicinity of the first UE. This has been described as the spatial replay problem.

SUMMARY

According to the present invention there is provided a method. The method comprises: obtaining imprecise location information relating to a location of the terminal device; and transmitting a proximity service discovery message. The discovery message may include the imprecise location information.

According to the present invention there is provided a terminal device for use in a cellular communications network. The terminal device is adapted for: obtaining imprecise location information relating to a location of the terminal device; and transmitting a proximity service discovery message. The discovery message may include the imprecise location information.

According to the present invention there is provided a terminal device for use in a cellular communications network. The device may comprise a processor and a memory, the memory containing instructions executable by the processor, such that the terminal device is operable to: obtain imprecise location information relating to a location of the terminal device; and transmit a proximity service discovery message. The discovery message may include the imprecise location information.

According to the present invention there is provided a terminal device for use in a cellular communications network. The device comprises an information module for obtaining imprecise location information relating to a location of the terminal device; and a transmission module for transmitting a proximity service discovery message. The discovery message may include the imprecise location information.

According to the present invention there is provided a method of operation of a terminal device. The method comprises receiving a proximity service discovery message containing location information; obtaining location information relating to a location of the terminal device; calculating a distance from the location indicated by the location information in the received discovery message to the location of the terminal device; and acting on the received discovery message only if the calculated distance is less than a predetermined distance.

According to the present invention there is provided a terminal device for use in a cellular communications network. The terminal device is adapted for: obtaining location information relating to a location of the terminal device; calculating a distance from the location indicated by the location information in the received discovery message to the location of the terminal device; and acting on the received discovery message only if the calculated distance is less than a predetermined distance.

According to the present invention there is provided a terminal device for use in a cellular communications network. The device comprising a processor and a memory, the memory containing instructions executable by the processor, such that the terminal device is operable to: receive a proximity service discovery message containing location information; obtain location information relating to a location of the terminal device; calculate a distance from the location indicated by the location information in the received discovery message to the location of the terminal device; and act on the received discovery message only if the calculated distance is less than a predetermined distance.

According to the present invention there is provided a terminal device for use in a cellular communications network. The device comprises a receiving module for receiving a proximity service discovery message containing location information; an information module for obtaining location information relating to a location of the terminal device; a calculation module for calculating a distance from the location indicated by the location information in the received discovery message to the location of the terminal device; and a determining module for acting on the received discovery message only if the calculated distance is less than a predetermined distance.

According to the present invention there is provided a method of operation of a network node in a cellular communications network, the method comprising: receiving a request for proximity service resources from a terminal device; and sending a response to the terminal device granting the requested proximity service resources, with a requirement that the terminal device includes modified location information in any transmitted proximity service discovery message.

According to the present invention there is provided a network node for use in a cellular communications network, being adapted for: receiving a request for proximity service resources from a terminal device; and sending a response to the terminal device granting the requested proximity service resources, with a requirement that the terminal device includes modified location information in any transmitted proximity service discovery message.

According to the present invention there is provided a network node for use in a cellular communications network. The network node comprises a processor and a memory, the memory containing instructions executable by the processor, such that the terminal device is operable to: receive a request for proximity service resources from a terminal device; and send a response to the terminal device granting the requested proximity service resources, with a requirement that the terminal device includes modified location information in any transmitted proximity service discovery message.

According to the present invention there is provided a network node for use in a cellular communications network. The network node comprises a receiving module for receiving a request for proximity service resources from a terminal device; and a transmission module for sending a response to the terminal device granting the requested proximity service resources, with a requirement that the terminal device includes modified location information in any transmitted proximity service discovery message.

According to the present invention there is provided a computer program configured, when run on a computer, to carry out any of the previous methods. According to the present invention there is provided a computer program product comprises a computer readable medium and such a computer program.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communications standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Figure 1:
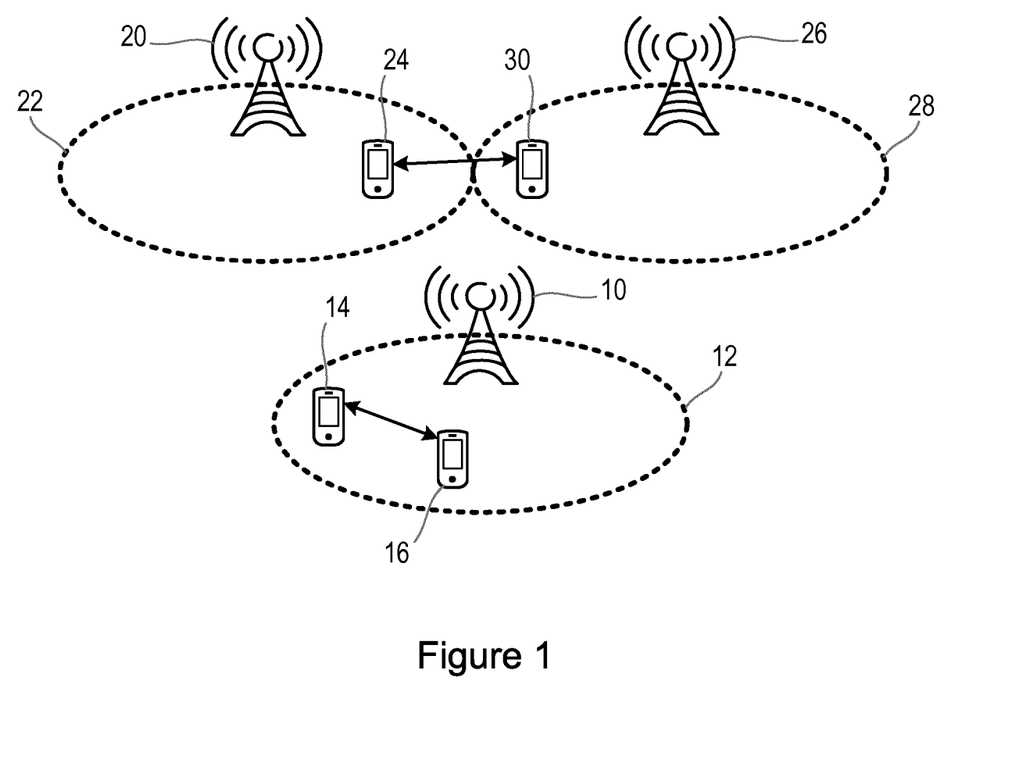
FIG. 1 illustrates a part of a cellular communications network.

FIG. 1 illustrates a part of a cellular communications network, including a first base station 10, serving a cell 12, with a first wireless communications device (or UE) 14 and a second wireless communications device (or UE) 16 within the cell 12.

The cellular communications network shown in FIG. 1 also includes a second base station 20, serving a second cell 22, with a third wireless communications device (or UE) 24 within the cell 22, and a third base station 26, serving a third cell 28, with a fourth wireless communications device (or UE) 30 within the cell 28.

Each of the base stations 10, 20, 26 has a connection to a core network (not shown in FIG. 1) of the cellular communications network, as described in more detail below.

In the examples described herein, the devices taking part in the methods are described as user equipment devices (UEs). It will be understood that this term is used to refer to user-operated portable communications devices, such as smartphones, laptop computers or the like, to other portable devices, such as tracking devices or the like, and to devices that are primarily intended to remain stationary in use, such as sensors, smart meters or the like.

In the example shown in FIG. 1, the network forms part of an Evolved UMTS Terrestrial Radio Access Network (E-UTRAN), as defined by the 3$^{rd}$ Generation Partnership Project (3GPP). The 3GPP system provides the possibility of Proximity Services (ProSe) that can be used by User Equipment (UE) devices that are in proximity to each other. The ProSe system is described in 3GPP TS 22.278 v13.0.0 and 3GPP TS 23.303 v13.0.0. For example, the ProSe system allows the possibility of Device-to-Device (D2D) communication, without passing messages through the Radio Access Network.

One aspect of the ProSe system is the process of ProSe Discovery. The ProSe Discovery process identifies that ProSe-enabled UEs are in proximity of each other, using Evolved UMTS Terrestrial Radio Access (with or without using the E-UTRAN) or the Extended Packet Core (EPC) network, when permission, authorization and proximity criteria are fulfilled. The proximity criteria can be configured by the operator. One specific form of ProSe Discovery is ProSe Direct Discovery, which is a procedure employed by a ProSe-enabled UE to discover other ProSe-enabled UEs in its vicinity by using only the capabilities of the two UEs with E-UTRA technology.

The term ProSe-enabled UE refers to a UE that supports ProSe requirements and associated procedures. A ProSe-enabled UE may be either a non-Public Safety UE and/or a Public Safety UE.

FIG. 1 shows scenarios for D2D ProSe where two UEs 14, 16 are each located in coverage of the same cell 12 and where two UEs 24, 30 are located in coverage of different cells 22, 28.

The ProSe Discovery process can be used as a standalone process (i.e. it is not necessarily followed by ProSe Communication) or as an enabler for other services.

Figure 2:
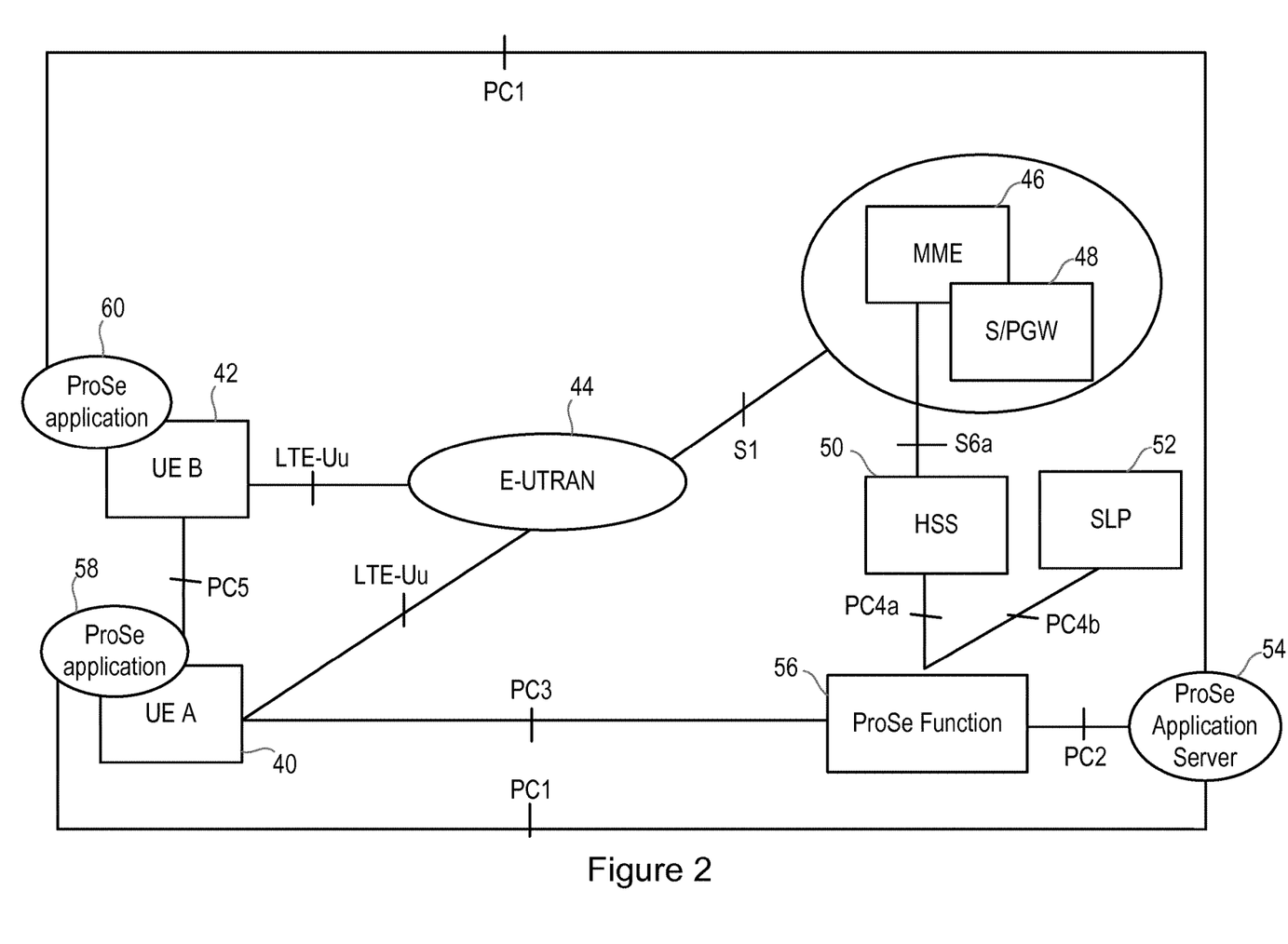
FIG. 2 illustrates another part of the cellular communications network of FIG. 1.

FIG. 2 is an illustration of the ProSe network architecture. In FIG. 2, it is assumed that two user equipment devices, UE A 40 and UE B 42, subscribe to the same Public Land Mobile Network (PLMN).

The two user equipment devices, UE A 40 and UE B 42, each have a respective connection over the LTE-Uu interface to the Evolved UMTS Terrestrial Radio Access Network (E-UTRAN) 44. An 51 interface connects the E-UTRAN to an Evolved Packet Core (EPC) network, which includes a Mobility Management Entity (MME) 46, Serving Gateway (SGW) and Packet Gateway (PGW) 48, Home Subscriber Server (HSS) 50, and Secure User Plane Location (SUPL) Location Platform (SLP) 52, amongst other network nodes.

The network also includes at least one Application server 54, which uses the ProSe capability for building the application functionality.

The core network also includes a ProSe Function 56, which provides functionality such as: Authorization and configuration of the UEs for discovery and direct communication (controlled by the ProSe Function in the user's Home PLMN in the non-roaming case and by the Home PLMN or Visited PLMN ProSe Function in the roaming case); enabling the functionality of the EPC level ProSe discovery; handling and storing of ProSe related new subscriber data and ProSe identities; and security related functionality.

The ProSe Function has a PC3 reference point towards each UE, and has a PC4 reference point towards the EPC.

The ProSe Function also has a PC2 reference point towards at least one ProSe Application Server, which uses the ProSe capability for building the application functionality.

Each UE includes a ProSe application 58, 60, which has a PC1 reference point towards the ProSe Application Server.

The UEs UE A and UE B use the PC5 reference point for control and user plane for discovery and communication, for relay and one-to-one communication (between UEs directly and between UEs over the LTE-Uu interface).

The ProSe Discovery process involves a discovery message being sent by one device, and received by another. The discovery message sent by a device includes an identifier.

It is proposed to add location information to discovery messages, in order to protect against spatial replays. In order to protect the privacy of the location of the UE, it is proposed to add imprecise location information so that it is difficult for a man in the middle to pinpoint the exact location of the sender. Thus, the imprecise location information allows the device receiving the discovery message to know the location of the sending device with a degree of precision that allows the receiving device to have a degree of certainty that the sending device is genuinely sending a discovery message, because the sending device is within the range of the proximity service. That is, depending on the range of the proximity service, the imprecise location information allows the device receiving the discovery message to know the location of the sending device to within 2 km, or to within 1 km, or to within 500 m, or any other approximate distance that allows the receiving device to decide whether the sending device is in proximity of the receiving device. However, the imprecise location information does not allow a device that detects the discovery message to know the exact location of the sending device. That is, the imprecise location information does not allow the device detecting the discovery message to know the location of the sending device with a precision 10 m, or of 50 m, or of 100 m, or of 300 m, or any other precision that is, depending on the service range, tolerable and deemed not to be so precise that it infringes the location privacy of the sending device.

Figure 3:
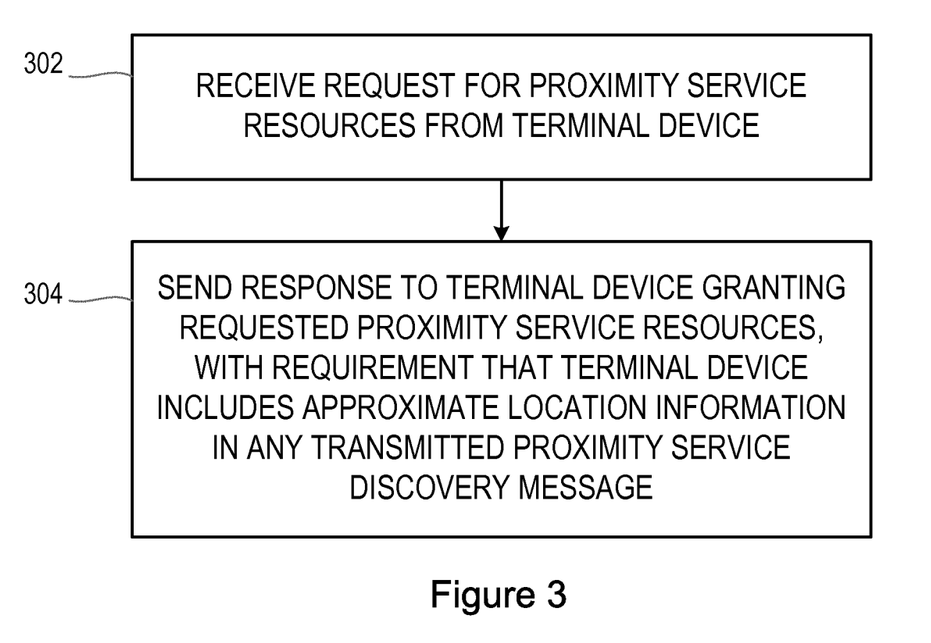
FIG. 3 is a flow chart illustrating a first process.

FIG. 3 is a flow chart, illustrating a process performed in a network node. Specifically, the process may be performed in the ProSe Function node 56 in a core network of a cellular communications network as shown in FIG. 2.

In step 302, the network node receives a request for proximity service resources from a terminal device such as a UE.

In step 304, the network node sends a response to the terminal device granting the requested proximity service resources, with a requirement that the terminal device includes imprecise location information in any transmitted proximity service discovery message.

In some embodiments, the ProSe Function makes the decision that a UE is only allowed to send discovery messages within a particular location or area (for example within a particular tracking area). The ProSe Function then provisions the UE with that information during the authorization phase and then the UEs are bound to send and accept discovery messages containing predefined location information relating to that particular location or area.

Figure 4:
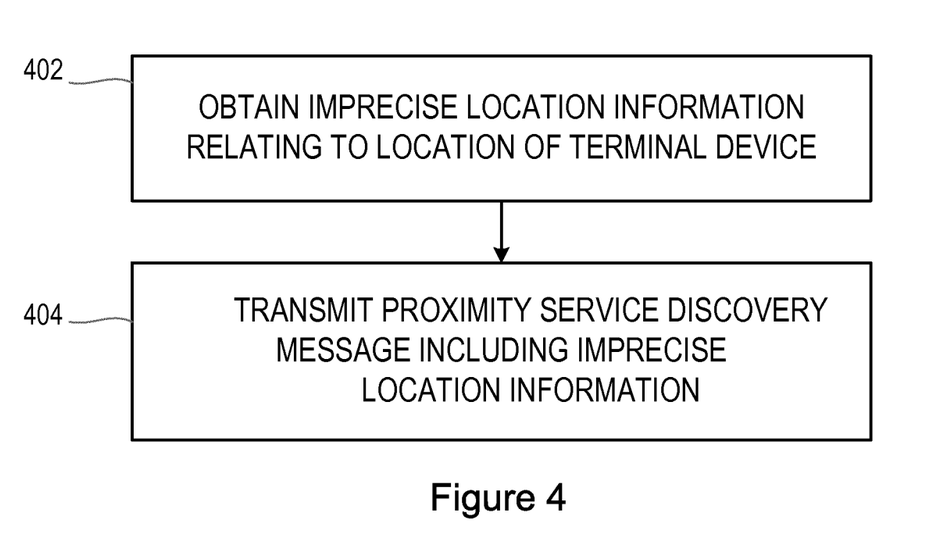
FIG. 4 is a flow chart illustrating a second process.

FIG. 4 is a flow chart, illustrating a process performed in a terminal device or UE that has been granted proximity service resources by a network node such as the ProSe Function node 56 in FIG. 2.

The UE determines that it wishes to send a discovery message over the PC5 reference point as shown in FIG. 2, for detection by at least one other UE. The content (payload) of the discovery message includes a message type indication, a ProSe Application Code, and a message integrity code.

Thus, the sending UE forms the content of the message.

Then, in step 402 of the process shown in FIG. 4, the UE obtains imprecise location information relating to its location.

The imprecise location information is included in the payload.

The UE then computes a message integrity code (MIC) using the formed content, that is, based on a payload of the discovery message, including the imprecise location information.

In step 404, the UE forms the final message using the payload, the MIC and any other required information (type, header, etc.), and then encodes and transmits the message. In this embodiment, the UE thus includes integrity protection for the imprecise location information in the transmitted discovery message.

The imprecise location information can be obtained in several different ways.

Figure 5:
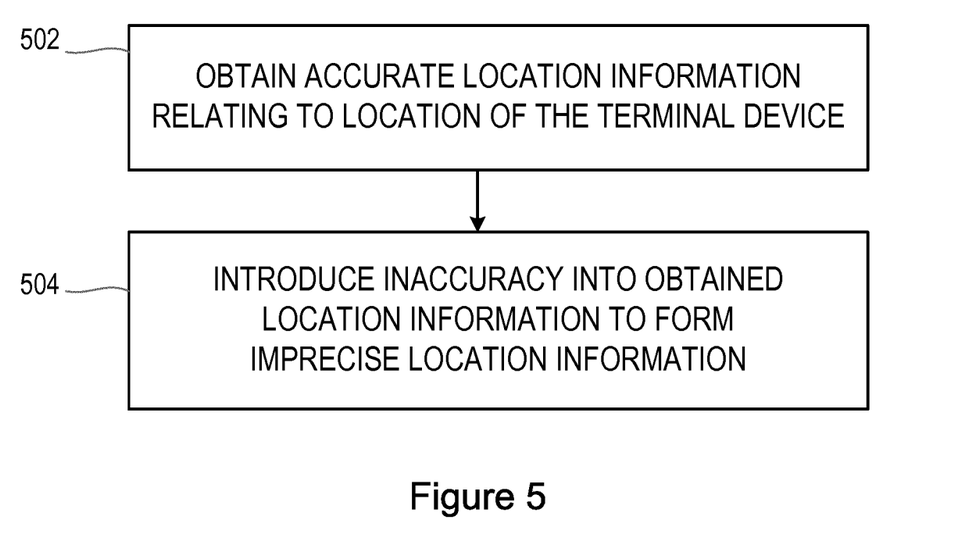
FIG. 5 is a flow chart illustrating a third process.

FIG. 5 is a flow chart, illustrating a process performed in a terminal device or UE as one possible way of obtaining the imprecise location information.

In step 502 of the process shown in FIG. 5, the UE obtains accurate location information relating to its location. For example, Global Navigation Satellite System (GNSS) such as Global Positioning System (GPS) coordinates can be obtained as accurate location information. This has the advantage that many modern UE devices have support for GPS. In addition, embodiments using GPS coordinates would allow the ProSe functionality to be provided both on and off-network coverage.

In step 504, some inaccuracy is introduced into the obtained location information, in order to obtain the imprecise location information. This has the advantage that the privacy of the sending UE is protected, and UE tracking is prevented, by avoiding revealing the precise location of the sending UE.

Where the accurate location information comprises GPS coordinates then, in some embodiments, in order to obtain the imprecise location information, some least significant bits of the GPS coordinates can be removed. Removing the LSB bits has the effect of introducing an error in the location. The more bits are removed, the bigger is the error. In order for the spatial protection to still work, the required number of bits to be removed should be such that the induced error is of the order of the range of the proximity service. For ProSe, this range is around 500 metres.

In other embodiments, the sending UE does not remove any LSB bits. Instead the UE obtains the imprecise location information by randomly picking a location within an error range, and selecting information that identifies that randomly picked location as the imprecise location information for inclusion in the discovery message.

For example, the error range may be more than one half of a range of the proximity service and less than two times the range of the proximity service. In some embodiments, the error range can be chosen to be equal to the maximal range of the proximity service although, in general, the choice of the error range is a compromise. Larger values for the error range will make the system more robust to a location attack (in which an attacker is able to deduce the location of the sending device by intercepting the discovery message containing the location information) but more vulnerable to the tunneling attack (in which the attacker retransmits the intercepted discovery message from a different location to deceive a receiving device). Smaller values for the error range will have the reverse effects on these attacks.

In still further embodiments, the imprecise location information can be obtained in other different ways.

For example, a UE can use the Tracking Area Identifier (TAI) of a tracking area in which it is located, or a CellID identifying its serving cell as imprecise location information.

When included in a discovery message, these forms of information provide some information about the location of the UE that is sending the discovery message, but avoid providing very precise location information that can be used to identify the exact location of the UE.

Figure 6:
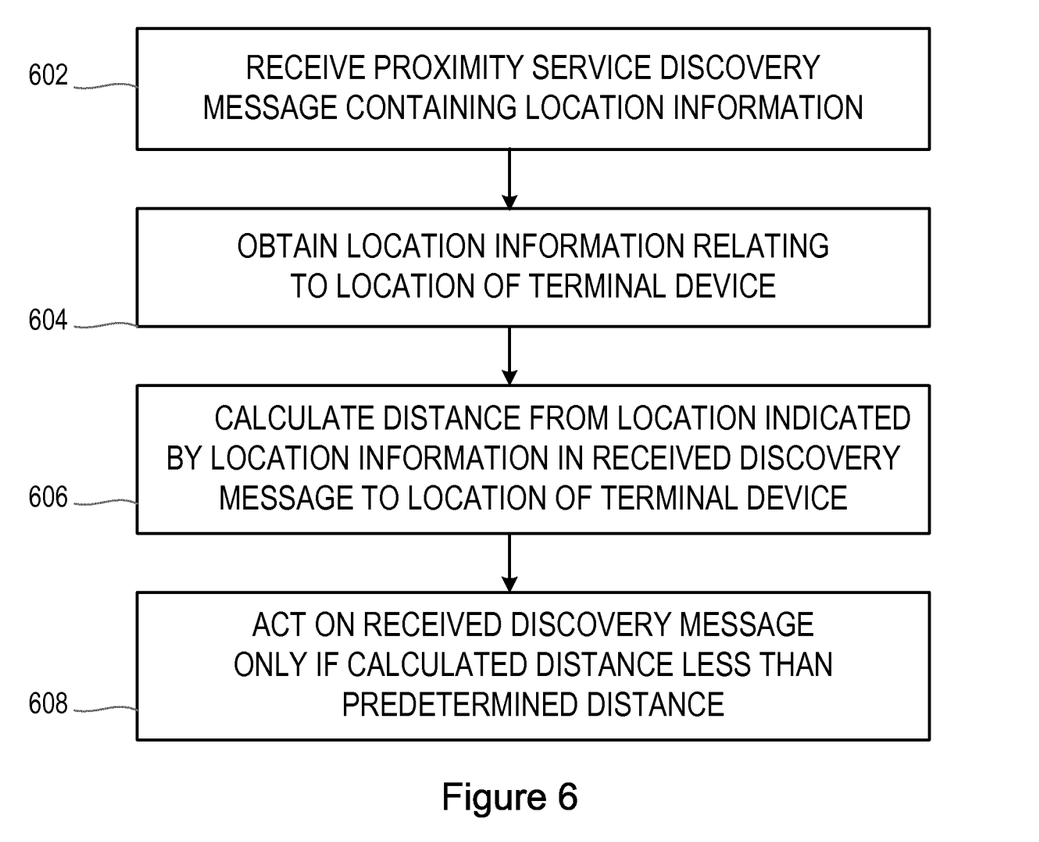
FIG. 6 is a flow chart illustrating a fourth process.

FIG. 6 is a flow chart, illustrating a process performed in a terminal device or UE that receives a discovery message. As described below, the UE now has the means to check that the sender is indeed in proximity.

In step 602, the UE receives a proximity service discovery message containing location information. On receipt, the UE receives and decodes the message. The UE then checks the integrity of the content using the message integrity code.

In step 604, the UE obtains location information relating to its location. In some embodiments, the UE retrieves its location information in a similar manner to how the sender did. For example, this location information can be Global Navigation Satellite System (GNSS) such as Global Positioning System (GPS) coordinates.

In step 606, the UE uses the location information enclosed in the received discovery message to obtain information about the location of the sender, and calculates a distance from the location indicated by the location information in the received discovery message to the location of the terminal device itself.

In step 608, the UE determines if the calculated distance is less than a predetermined distance. The UE may then determine that the received discovery message was valid only if the calculated distance is less than the predetermined distance. In some embodiments, it may then act on the received discovery message only if the calculated distance is less than the predetermined distance. Otherwise, the UE may determine that the received discovery message originated from a UE that was outside the range of the proximity service, and therefore that it has been the subject of a replay attack.

The value of the predetermined distance used in the determination of step 608 can be set to different values. For example, the predetermined distance may depend on a range of the proximity service.

This is illustrated with reference to FIG. 7.

FIGS. 7(a) and 7(b) illustrate an embodiment in which a sending terminal device, UE A, sends a discovery message in which the included imprecise location information comprises location information that identifies a randomly selected location within a predetermined distance from a location identified by the obtained accurate location information. For example, the predetermined distance may be more than one half of a range of the proximity service and less than two times the range of the proximity service. In this example, by way of illustration, the predetermined distance is set to be equal to the range of the proximity service.

Figure 7:
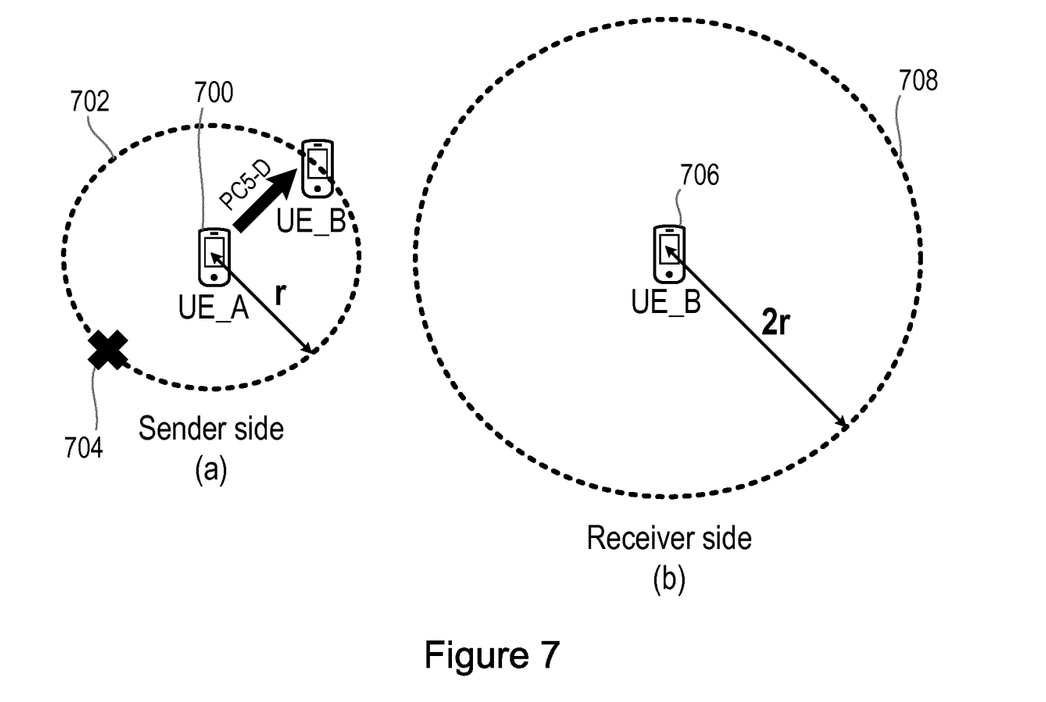
FIG. 7 illustrates a part of the network of FIG. 1 to illustrate the third process.

Thus, the sending device UE_A obtains accurate location information that identifies its location as the location 700 shown in FIG. 7(*a*). The "predetermined distance" mentioned above, that is the service range of the proximity service, is shown as r in FIG. 7(*a*), and may for example be in the region of 500 m.

The sending device UE_A therefore selects, for example randomly, a location from within the circle 702 and obtains location information relating to that selected location. That imprecise location information is then included in the discovery message, which is detected in this example by the receiving device, UE_B.

As shown in FIG. 7(*a*), one location that could have been selected is the location 704, indicated by the cross in FIG. 7(*a*). This location is diametrically opposite the location of the receiving device, UE_B, with the selected location 704 and the location of the receiving device, UE_B, both being at the assumed maximum range r of the proximity service, and therefore being separated by a distance 2*r*. This situation therefore represents the worst case that the receiving device must take account of in step 608 of the process shown in FIG. 6.

Therefore, as shown in FIG. 7(*b*), when performing step 608 of the process shown in FIG. 6, the receiving terminal device has to determine whether the calculated distance from the location indicated by the location information in the received discovery message to the location of the terminal device itself is less than the distance 2*r*. Starting from its own location 706, the receiving terminal device has to determine whether the location indicated by the location information in the received discovery message lies within the circle 708. Any discovery message in which the calculated distance is less than the distance 2*r* will be considered as valid. (The relevant distance, when considering step 608, is the sum of the "predetermined distance" used by the sending UE in step 504 and the range of the proximity service.)

In other embodiments, in step 608 of the process shown in FIG. 6, the receiving terminal device has to take account of imprecise location information taking other forms. For example, if the received imprecise location information comprises a Tracking Area Identifier (TAI) of a tracking area in which the sending device is located, or a CellID identifying a serving cell of the sending device, the receiving device may accept discovery messages in which the received location information matches the corresponding location relating to the receiving device itself. That is, if the receiving device identifies that it is in a certain tracking area, or served by a certain cell, it will accept as valid discovery messages in which the received location information comprises the Tracking Area Identifier (TAI) of that tracking area, or the CellID identifying that cell. In further embodiments, if the receiving device identifies that it is in a certain tracking area, it will accept as valid discovery messages in which the received location information comprises the Tracking Area Identifier (TAI) for any tracking area within a predetermined distance of that tracking area. Similarly, in still further embodiments, if the receiving device identifies that it is served by a certain cell, it will accept as valid discovery messages in which the received location information comprises the CellID identifying any cell within a predetermined distance of that cell.

Thus, the receiving UE may rely on its own geographical location to decide if it can accept messages for example from nearby tracking areas.

Thus, although an attacker is still able to tunnel intercepted discovery messages and may attempt to fool out of range UEs to believe that they are in proximity, this will only work for receiver UEs within a very limited range of the sending UE.

Thus, the additional location information is protected by the MIC so an attacker cannot modify it without the receiving UE noticing it. Moreover, it protects against spatial replays since the receiving UE based on his own location can check if the location information provided in the message is reasonable or falls within the range of the service. Finally, introducing errors in the location protects the privacy of the sending UE and does not leak additional information. For example, if the introduced errors make the location information vary within the range of the proximity service, the attacker is unlikely to be able to pinpoint the exact location of the sender UE.

Figure 8:
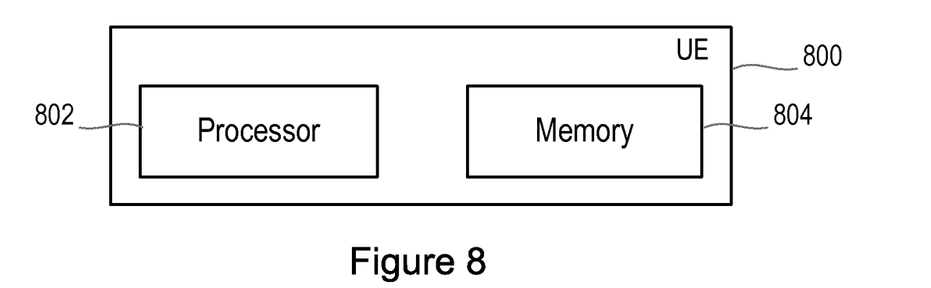
FIG. 8 illustrates a terminal device in the network of FIG. 1.

FIG. 8 shows a terminal device (UE) 800 that can be adapted or configured to operate according to one or more of the non-limiting example embodiments described. The UE 800 comprises a processor or processing unit 802 that controls the operation of the UE 800. The UE 800 also comprises a memory or memory unit 804 that is connected to the processing unit 802 and that contains instructions or computer code executable by the processing unit 802 and other information or data required for the operation of the UE 800 in accordance with the methods described herein. The terminal device is also referred to herein as a mobile station (MS).

Figure 9:
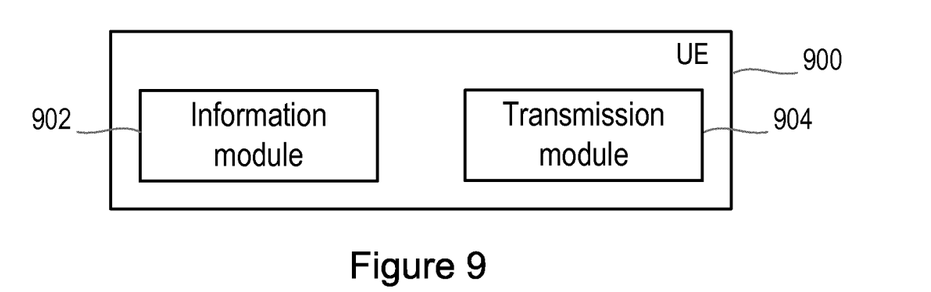
FIG. 9 illustrates a terminal device in the network of FIG. 1.
Figure 10:
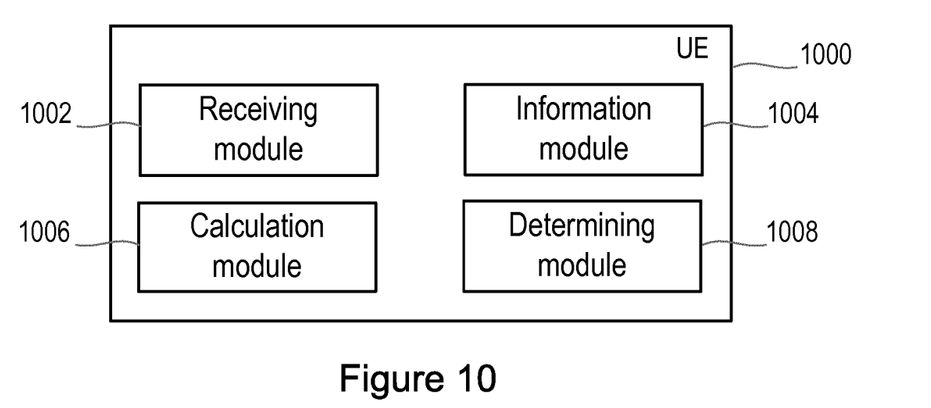
FIG. 10 illustrates a terminal device in the network of FIG. 1.
Figure 11:
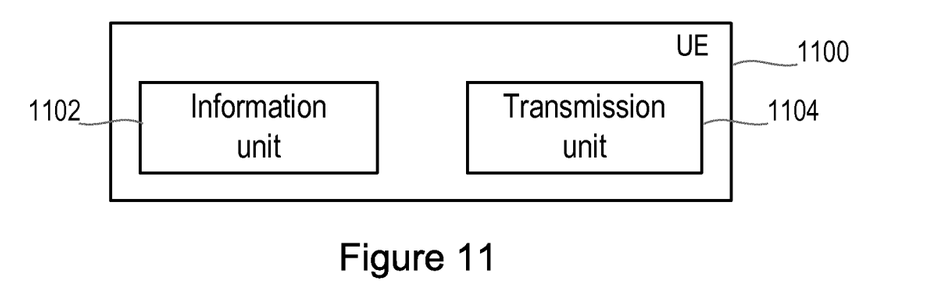
FIG. 11 illustrates a terminal device in the network of FIG. 1.
Figure 12:
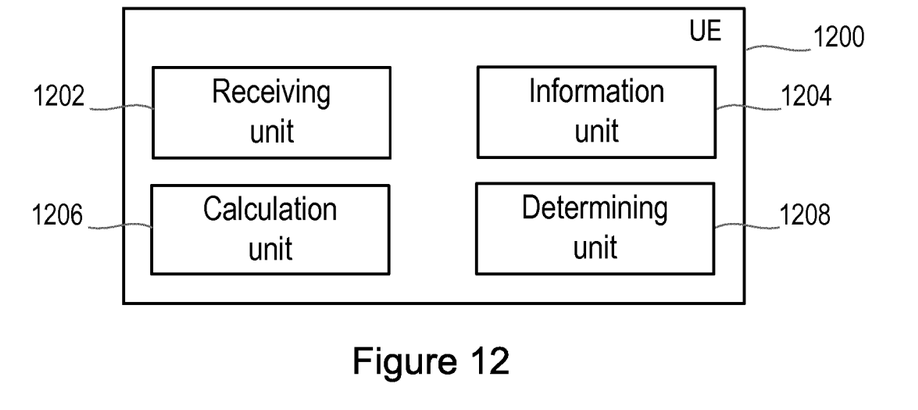
FIG. 12 illustrates a terminal device in the network of FIG. 1.

FIGS. 9, 10, 11 and 12 illustrate functional units in other embodiments of devices or nodes 900, 1000, 1100 and 1200 which may execute any of the methods described herein, for example according to computer readable instructions received from a computer program. It will be understood that the modules illustrated in FIGS. 9 and 10 are software implemented functional units, and may be realised in any appropriate combination of software modules. It will be understood that the units illustrated in FIGS. 11 and 12 are hardware implemented functional units, and may be realised in any appropriate combination of hardware units.

FIG. 9 illustrates a terminal device (UE) 900 according to embodiments. The terminal device 900 comprises an information module 902 for obtaining imprecise location information relating to a location of the terminal device. The terminal device 900 also comprises a transmission module 904 for transmitting a proximity service discovery message, wherein the discovery message includes the imprecise location information.

FIG. 10 illustrates a terminal device (UE) 1000 according to embodiments. The terminal device 1000 comprises a receiving module 1002 for receiving a proximity service discovery message containing location information; and an information module 1004 for obtaining location information relating to a location of the terminal device. The terminal device 1000 also comprises a calculation module 1006 for calculating a distance from the location indicated by the location information in the received discovery message to the location of the terminal device; and a determining module 1008 for acting on the received discovery message only if the calculated distance is less than a predetermined distance.

FIG. 11 illustrates a terminal device (UE) 1100 according to embodiments. The terminal device 1100 comprises an information unit 1102 for obtaining imprecise location information relating to a location of the terminal device. The terminal device 1100 also comprises a transmission unit 1104 for transmitting a proximity service discovery message, wherein the discovery message includes the imprecise location information.

FIG. 12 illustrates a terminal device (UE) according to embodiments. The terminal device 1200 comprises a receiving unit 1202 for receiving a proximity service discovery message containing location information; and an information unit 1204 for obtaining location information relating to a location of the terminal device. The terminal device 1200 also comprises a calculation unit 1206 for calculating a distance from the location indicated by the location information in the received discovery message to the location of the terminal device; and a determining unit 1208 for acting on the received discovery message only if the calculated distance is less than a predetermined distance.

Figure 13:
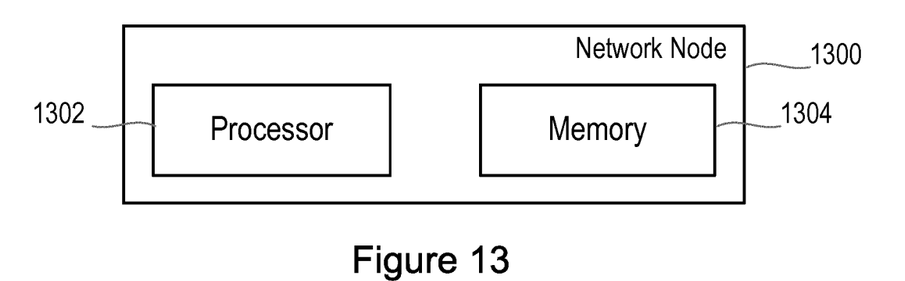
FIG. 13 illustrates a network node in the network of FIG. 1.

FIG. 13 shows a network node 1300 that can be adapted or configured to operate according to one or more of the non-limiting example embodiments described. The network node 1300 comprises a processor or processing unit 1302 that controls the operation of the network node 1300. The network node 1300 also comprises a memory or memory unit 1304 that is connected to the processing unit 1302 and that contains instructions or computer code executable by the processing unit 1302 and other information or data required for the operation of the UE 1300 in accordance with the methods described herein.

Figure 14:
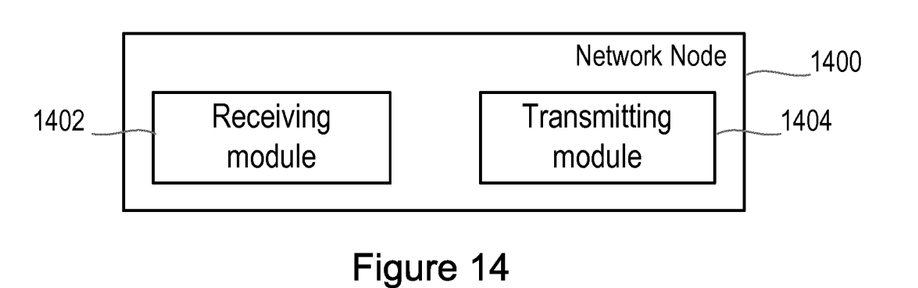
FIG. 14 illustrates a network node in the network of FIG. 1.
Figure 15:
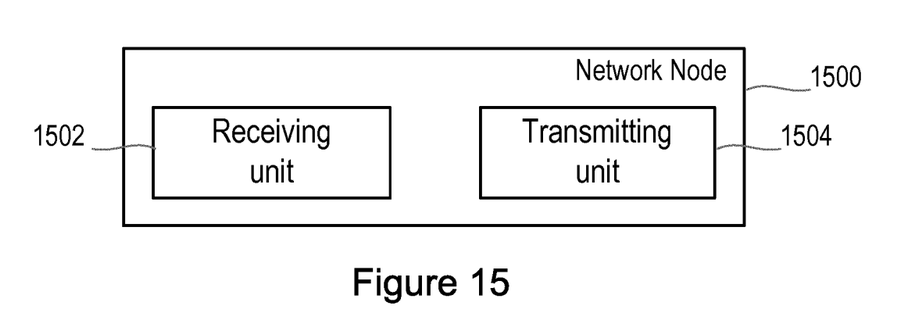
FIG. 15 illustrates a network node in the network of FIG. 1.

FIGS. 14 and 15 illustrate functional units in other embodiments of devices or nodes 1400 and 1500 which may execute any of the methods described herein, for example according to computer readable instructions received from a computer program. It will be understood that the modules illustrated in FIG. 14 are software implemented functional units, and may be realised in any appropriate combination of software modules. It will be understood that the units illustrated in FIG. 15 are hardware implemented functional units, and may be realised in any appropriate combination of hardware units.

FIG. 14 illustrates a network node 1400 according to embodiments. The network node 1400 comprises a receiving module 1402 for receiving a request for proximity service resources from a terminal device; and a transmitting module 1404 for sending a response to the terminal device granting the requested proximity service resources, with a requirement that the terminal device includes modified location information in any transmitted proximity service discovery message.

FIG. 15 illustrates a network node 1500 according to embodiments. The network node 1500 comprises a receiving unit 1502 for receiving a request for proximity service resources from a terminal device; and a transmitting unit 1504 for sending a response to the terminal device granting the requested proximity service resources, with a requirement that the terminal device includes modified location information in any transmitted proximity service discovery message.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a terminal device, comprising:
   obtaining accurate location information relating to a location of the terminal device;
   obtaining imprecise location information relating to a location of the terminal device by introducing an inaccuracy into the obtained accurate location information to form the imprecise location information; and
   transmitting a proximity service discovery message, wherein the discovery message includes the imprecise location information.

2. A method according to claim 1, further comprising:
   including integrity protection for the imprecise location information in the transmitted discovery message.

3. A terminal device for use in a communications network, the device comprising a processor circuit and a memory, the memory containing instructions executable by the processor circuit, such that the terminal device is operable to:
   obtain imprecise location information relating to a location of the terminal device; and
   transmit a proximity service discovery message, wherein the discovery message includes the imprecise location information;
   wherein the memory further contains instructions executable by the processor circuit, such that the terminal device is operable to: obtain accurate location information relating to a location of the terminal device; and introduce an inaccuracy into the obtained location information to form the imprecise location information.

4. A terminal device according to claim 3, wherein the memory further contains instructions executable by the processor circuit, such that the terminal device is operable to:
   include integrity protection for the imprecise location information in the transmitted discovery message.

5. A terminal device according to claim 3, wherein the memory further contains instructions executable by the processor circuit, such that the terminal device is operable to:
   calculate a message integrity code based on a payload of the discovery message including the imprecise location information; and
   transmit the calculated message integrity code in the discovery message.

6. A terminal device according to claim 3, wherein the obtained accurate location information comprises global navigation satellite system (GNSS) data.

7. A terminal device according to claim 3, wherein the memory further contains instructions executable by the processor circuit, such that the terminal device is operable to: introduce the inaccuracy into the obtained accurate location information to form the imprecise location information by removing some least significant bits of the obtained accurate location information.

8. A terminal device according to claim 3, wherein the memory further contains instructions executable by the processor circuit, such that the terminal device is operable to: introduce the inaccuracy into the obtained accurate location information to form the imprecise location information by forming imprecise location information that identifies a location within a predetermined distance from a location identified by the obtained accurate location information.

9. A terminal device according to claim 8, wherein the memory further contains instructions executable by the processor circuit, such that the terminal device is operable to: introduce the inaccuracy into the obtained location information to form imprecise location information by forming imprecise location information that identifies a randomly selected location within a predetermined distance from a location identified by the obtained accurate location information.

10. A terminal device according to claim 8, wherein the predetermined distance is more than one half of a range of a proximity service to which the proximity service discovery message relates and less than two times the range of the proximity service.

11. A terminal device according to claim 3, wherein the memory further contains instructions executable by the processor circuit, such that the terminal device is operable to: introduce the inaccuracy into the obtained accurate location information to form the imprecise location information by removing two or more bits of the obtained accurate location information, wherein the two or more bits that are removed are two or more bits that are closest to, and including, the least significant bit of the obtained accurate location information.

12. A method of operation of a network node, comprising:
receiving a request for proximity service resources from a terminal device; and
sending a response to the terminal device granting the requested proximity service resources, with a requirement that the terminal device includes modified location information in any transmitted proximity service discovery message, wherein said modified location information comprises location information that has been modified to introduce an inaccuracy into the location information, and wherein the requirement is a requirement that the terminal device includes the modified location information in any proximity service discovery message the terminal device transmits to another terminal device for proximity service discovery.

13. A method as defined in claim 12, wherein the network node is a ProSe Function node in a core network of a cellular communications network.

14. A network node for use in a communications network, the network node comprising a processor circuit and a memory, the memory containing instructions executable by the processor circuit, such that the terminal device is operable to:
receive a request for proximity service resources from a terminal device; and
send a response to the terminal device granting the requested proximity service resources, with a requirement that the terminal device includes modified location information in any transmitted proximity service discovery message, wherein said modified location information comprises location information that has been modified to introduce an inaccuracy into the location information, and wherein the requirement is a requirement that the terminal device includes the modified location information in any proximity service discovery message the terminal device transmits to another terminal device for proximity service discovery.

15. A network node as defined in claim 14, wherein the network node is a ProSe Function node in a core network of a cellular communications network.

* * * * *